US010114636B2

(12) United States Patent
Lehner et al.

(10) Patent No.: US 10,114,636 B2
(45) Date of Patent: Oct. 30, 2018

(54) PRODUCTION TELEMETRY INSIGHTS INLINE TO DEVELOPER EXPERIENCE

(71) Applicant: MICROSOFT TECHNOLOGY LICENSING, LLC, Redmond, WA (US)

(72) Inventors: Randall Lehner, Redmond, WA (US); Robert Samer, Redmond, WA (US); Olexiy Karpus, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 97 days.

(21) Appl. No.: 15/133,278

(22) Filed: Apr. 20, 2016

(65) Prior Publication Data

US 2017/0308375 A1 Oct. 26, 2017

(51) Int. Cl.
| | | |
|---|---|---|
| G06F 9/44 | (2018.01) | |
| G06F 8/70 | (2018.01) | |
| G06F 11/30 | (2006.01) | |
| G06F 11/32 | (2006.01) | |
| G06F 11/34 | (2006.01) | |
| G06F 8/33 | (2018.01) | |
| G06F 9/451 | (2018.01) | |

(52) U.S. Cl.
CPC ............... *G06F 8/70* (2013.01); *G06F 8/33* (2013.01); *G06F 9/453* (2018.02); *G06F 11/302* (2013.01); *G06F 11/323* (2013.01); *G06F 11/3409* (2013.01); *G06F 11/3466* (2013.01); *G06F 2201/865* (2013.01)

(58) Field of Classification Search
None
See application file for complete search history.

(56) References Cited

U.S. PATENT DOCUMENTS

| | | | |
|---|---|---|---|
| 6,996,517 B1 * | 2/2006 | Papaefstathiou | G06F 8/51 702/186 |
| 7,861,242 B2 * | 12/2010 | Rygaard | G06F 9/4856 717/168 |
| 7,877,642 B2 | 1/2011 | Ding et al. | |
| 7,882,495 B2 | 2/2011 | Tillmann et al. | |

(Continued)

FOREIGN PATENT DOCUMENTS

WO 2015071777 A1 5/2015

OTHER PUBLICATIONS

"International Search Report and Written Opinion Issued in PCT Application No. PCT/US2017/026882", dated Jul. 26, 2017, 12 Pages.

(Continued)

*Primary Examiner* — Insun Kang
(74) *Attorney, Agent, or Firm* — Michael Best & Friedrich LLP

(57) ABSTRACT

Production telemetry insights are provided inline to developer experience. Some examples are directed to curating large amount of aggregated tracing and diagnostic data from an already deployed service, mapping cost profile information (e.g., CPU, memory, exceptions, etc.) to code components, and providing context specific recommendations and/or warnings to a developer working within the source code for the service in conjunction with different components. Detection and mitigation of potential problems may be enabled prior to the code being committed to a source code repository.

17 Claims, 8 Drawing Sheets

(56) References Cited

U.S. PATENT DOCUMENTS

| | | | | |
|---|---|---|---|---|
| 7,930,676 B1* | 4/2011 | Thomas | | G06F 9/44505 706/45 |
| 8,065,665 B1* | 11/2011 | Kosche | | G06F 8/443 717/127 |
| 8,156,481 B1* | 4/2012 | Koh | | G06F 11/3466 717/151 |
| 8,631,280 B2 | 1/2014 | Sankar | | G06F 11/366 714/38.12 |
| 8,869,022 B1 | 10/2014 | Mills et al. | | |
| 8,880,933 B2 | 11/2014 | Bhagwan et al. | | |
| 9,110,770 B1 | 8/2015 | Raju et al. | | |
| 9,201,646 B2 | 12/2015 | Balachandran | | |
| 9,448,913 B2* | 9/2016 | Hoffmann | | G06F 11/3612 |
| 2005/0155026 A1* | 7/2005 | DeWitt, Jr. | | G06F 8/443 717/158 |
| 2007/0033578 A1* | 2/2007 | Arnold | | G06F 8/443 717/130 |
| 2007/0266368 A1* | 11/2007 | Szpak | | G06F 8/10 717/105 |
| 2007/0294681 A1* | 12/2007 | Tuck | | G06F 11/3404 717/149 |
| 2008/0120543 A1 | 5/2008 | Cahill et al. | | |
| 2008/0127107 A1* | 5/2008 | Kosche | | G06F 11/3447 717/128 |
| 2008/0134170 A1* | 6/2008 | Astheimer | | G09B 5/00 717/175 |
| 2009/0138858 A1* | 5/2009 | Livshits | | G06F 11/3419 717/130 |
| 2009/0199160 A1* | 8/2009 | Vaitheeswaran | | G06F 11/3414 717/124 |
| 2011/0138363 A1* | 6/2011 | Schmelter | | G06F 11/3636 717/128 |
| 2011/0145661 A1 | 6/2011 | Marum et al. | | |
| 2011/0252394 A1* | 10/2011 | Sharma | | G06F 11/3616 717/101 |
| 2011/0271149 A1 | 11/2011 | Roussel et al. | | |
| 2011/0283266 A1* | 11/2011 | Gallagher | | G06F 9/44 717/130 |
| 2012/0167042 A1 | 6/2012 | Tillmann et al. | | |
| 2012/0174076 A1* | 7/2012 | Rajic | | G06F 11/3466 717/128 |
| 2012/0232880 A1* | 9/2012 | Haber | | G06F 11/3612 703/22 |
| 2012/0311540 A1 | 12/2012 | Fanning et al. | | |
| 2013/0007700 A1 | 1/2013 | Villar et al. | | |
| 2013/0152047 A1* | 6/2013 | Moorthi | | G06F 11/368 717/124 |
| 2014/0019598 A1* | 1/2014 | Krajec | | H04L 67/1002 709/220 |
| 2014/0115596 A1* | 4/2014 | Khan | | G06F 9/5011 718/104 |
| 2014/0201714 A1* | 7/2014 | Vaidyan | | G06F 11/3668 717/124 |
| 2014/0282425 A1* | 9/2014 | Zhao | | G06F 11/3688 717/127 |
| 2015/0067654 A1* | 3/2015 | Seto | | G06F 11/3636 717/128 |
| 2015/0143344 A1 | 5/2015 | Davis | | |
| 2015/0186253 A1* | 7/2015 | Abraham | | G06F 11/3688 717/124 |
| 2015/0212838 A1* | 7/2015 | Pirvu | | G06F 9/45516 717/148 |
| 2015/0234730 A1* | 8/2015 | Puthuff | | G06F 11/3636 717/128 |
| 2016/0306613 A1* | 10/2016 | Busi | | G06F 11/3668 |
| 2016/0357660 A1* | 12/2016 | Dean | | G06F 11/3692 |
| 2016/0357886 A1* | 12/2016 | Fralick | | G06F 17/5009 |
| 2017/0185409 A1* | 6/2017 | de Paula Rosa Piga | | G06F 9/30192 |

OTHER PUBLICATIONS

"Using Cloud Debugger", Retrieved on: Feb. 13, 2016 Available at: https://cloud.google.com/debugger/docs/debugging.

Abrams, Brad, "Cloud Platform at Google I/O—Enabling developers to tame production systems in the cloud", published on: Jun. 25, 2014 Available at: http://googledevelopers.blogspot.in/2014/06/cloud-platform-at-google-io-enabling.html.

"Diagnostic Profiler: Diagnostic Design Software", Retrieved on: Feb. 13, 2016 Available at: http://www.mikrossystems.com/Diagnostic_Profiler_2015.pdf.

"Wind River Workbench Diagnostics", Published on: Feb. 21, 2007 Available at: http://www.windriver.com/products/product-notes/workbench-diagnostics-product-note.pdf.

"How to Build, ebug and Deploy Apps for Google App Engine with Cloud IDE", Published on: Jul. 9, 2012 Available at: https://www.exoplafform.com/company/en/resource-viewer/Tutorial/how-to-build-debug-and-deploy-apps-for-google-app-engine-with-cloud-ide.

* cited by examiner

PRODUCTION TELEMETRY INSIGHTS INLINE TO DEVELOPER EXPERIENCE

BACKGROUND

Cloud based services leverage continuous integration and deployment, meaning that code changes are being made on a constant basis and those changes are deployed from a developer's computer out to production at a rapid cadence. In this model, any regressions in the code may have to be found as early as possible, preferably at the developer's computer before she or he commits the code. While detection of functional issues is a tenable challenge, detection of poorly performing and scaling code at the developer stage is historically challenging (usually requiring days of lab based analysis or the risk of rolling out code to larger swaths of customers) which may defeat some of the core principals of continuous integration and deployment.

In some approaches, developers put benchmarks in their code receive benchmark measurements, analyze, rewrite, and then repeat the whole process. The static benchmark based approach may not necessarily reflect actual performance hot spots such as exceptions that are associated with higher memory usage or processor usage.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing production telemetry insights inline to developer experience. In some examples, performance data associated with a source code of a hosted service may be collected at server level by a plurality of profiling agents deployed across servers of the datacenter executing the hosted service. The collected performance data may be aggregated at the server level mapping the data to cost profile information. Aggregation of server level aggregated data at a big data store may be managed and scheduled by an aggregation module and one or more tables may be generated from the aggregated data. A visualization module may generate a context-aware visualization based on the one or more tables to provide information to a developer associated with the performance of the source code.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
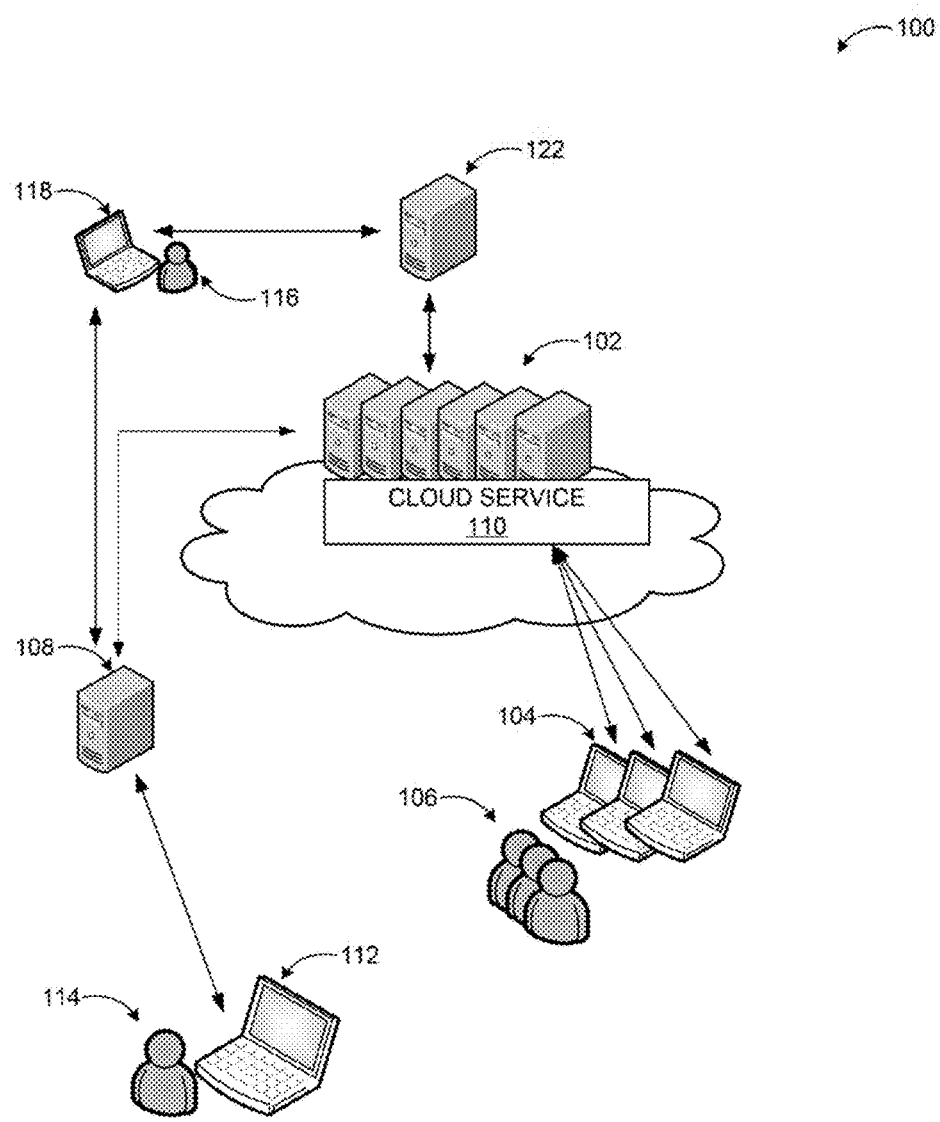
FIG. 1 is a conceptual display diagram illustrating an example computing environment for providing benchmark based feedback to developers.

As briefly described above, embodiments are directed to production telemetry insights inline to developer experience. Some examples are directed to curating large amount of aggregated tracing and diagnostic data from an already deployed service, mapping cost profile information (e.g., CPU, memory, exceptions, etc.) to code components, and providing context specific recommendations and/or warnings to a developer working within the source code for the service in conjunction with different components. Detection and mitigation of potential problems may be enabled prior to the code being committed to a source code repository.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with a application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing production telemetry insights inline to developer experience. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that allow the application or service to interact or communicate with one or more other applications and services managed by separate entities.

The technical advantages of providing production telemetry insights inline to developer experience may include, among others, increased efficiency and reliability in hosted service deployments, updates, upgrades, and performance, reduced processing and network bandwidth usage (reduced number of updates and upgrades), and improved user experience by allowing potential issues to be detected prior to source code being deployed.

Embodiments address a need that arises from very large scale of operations created by networked computing and cloud based services that cannot be managed by humans. The actions/operations described herein are not a mere use of a computer, but address results of a system that is a direct consequence of software used as a service such as communication services offered in conjunction with communications.

FIG. 1 is a conceptual display diagram illustrating an example computing environment for providing benchmark based feedback to developers.

As shown in a diagram 100, servers 102 may execute a cloud-based application or service 110 that may provide a variety of functionalities to users 106 through client devices (and/or applications) 104. For example, the cloud-based application or service 110 may be a productivity service that includes a number of applications directed to word processing functionality, communication functionality, spreadsheet functionality, etc. The cloud-based application or service 110 may be developed (code written) by one or more developers 114 using a code development system that may be executed on a server 108 and accessed through a client device or application 112. As changes are made to the cloud-based application or service 110 at regular intervals or on-demand for updates, upgrades, or problem fixes, those changes may also be provided by the one or more developers 114.

In some cases, a separate system may be set up to monitor the performance of the cloud-based application or service 110. For example, a monitoring service executed on a server 122 may collect information associated with problems, resource usage, etc. based on benchmark points in the code and provide those to one or more developers 116 through client device or application 118. The one or more developers 116 may process the collected information and make suitable changes to the code or provide the information to the one or more developers 114 to make suitable changes to the code.

However, the static benchmark based approach described above may not necessarily reflect actual performance hot spots such as exceptions that are associated with higher memory usage or processor usage. Furthermore, developers 114 may have to manually assess impact of code changes without an automated and insight based feedback of the actual execution of the original code.

Users 106 may access the cloud-based application or service 110 through their respective client devices or applications 104 over one or more networks. The networks may provide wired or wireless communications between nodes, such as the client devices 104 or the servers 102. In some embodiments, components of the cloud-based, application or service 110 may also be locally executed on a user's computing device. Similarly, developers 114 and/or developers 116 may access respective code writing or code monitoring services through networked communications between client devices/applications and servers. A user experience may be provided to the users 106 and the developers 114, 116 as a visual display through which the users 106 and the developers 114, 116 may interact with the respective applications/services visually. The interactions may include a touch input, a gesture input, a voice command, eye tracking, a gyroscopic input, a pen input, mouse input, and/or a keyboards input, among others.

The computing devices used to access respective applications/services may each include a display device, such as a touch enabled display component, and a monitor, among others, to provide access to the respective application/service for the users and developers through a web browser (thin client) or a local client application (thick client). The computing devices may include a desktop computer, a laptop computer, a tablet, a handheld device, a vehicle mount computer, an embedded computer system, a smart phone, and a wearable computer, among other computing devices, for example.

While the example system in FIG. 1 has been described with specific components including the servers 102, 122, and 108, and respective client devices/applications, embodiments are not limited to these components or system configurations and can be implemented with other system configuration employing fewer or additional components.

Figure 2:
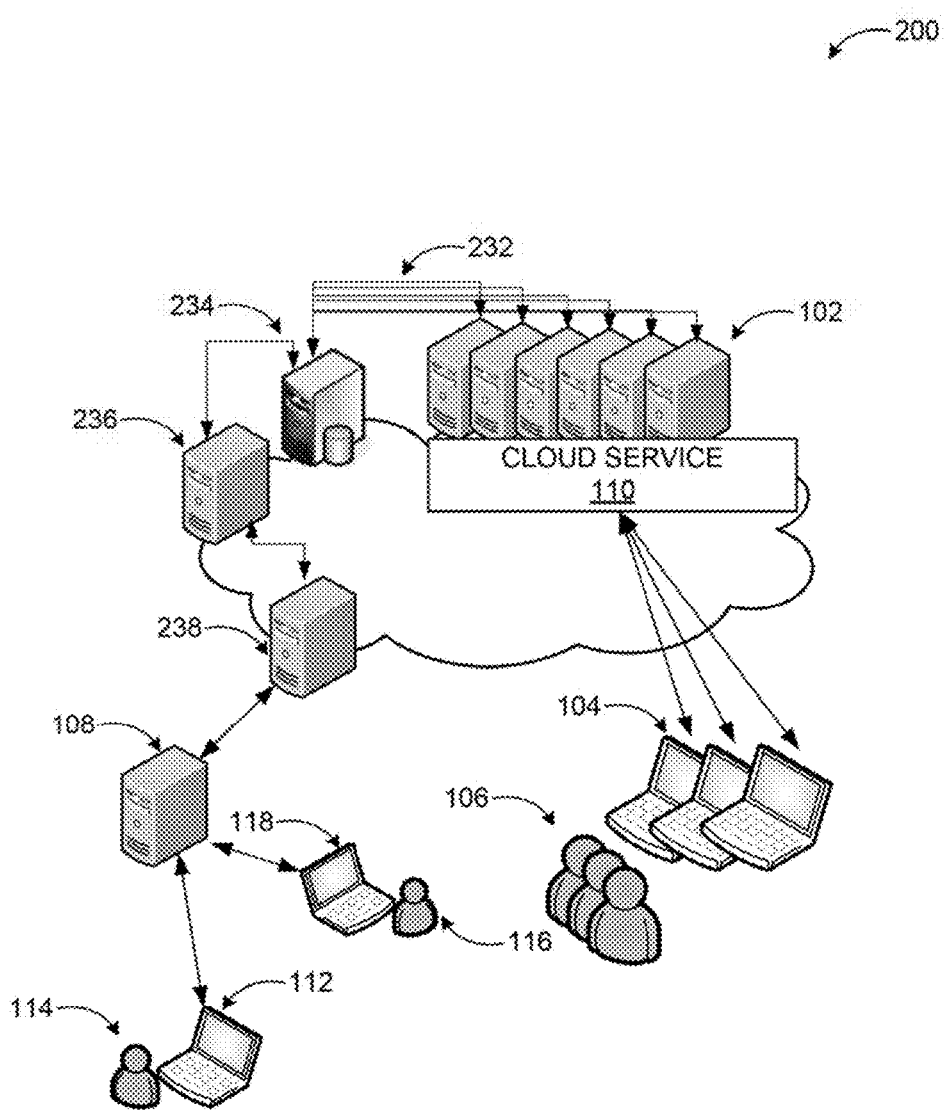
FIG. 2 is a conceptual display diagram illustrating an example computing environment for providing production telemetry insights inline to developer experience, according to embodiments.

FIG. 2 is a conceptual display diagram illustrating an example computing environment for providing production telemetry insights inline to developer experience, according to embodiments.

Similar to FIG. 1, a cloud-based application or service 110 may be executed on servers 102 and provide a variety of functionality to users 106 through client devices (and/or applications) 104. Servers 102 may include a number of general purpose and a number of special purpose servers. For example, some servers may execute applications and modules within the cloud-based service 110 while other servers may perform specific tasks such as storing specific data, managing security, facilitating communications, and so on. In a practical implementation of a large scale service, servers 102 may include thousands of servers at one or more server farms.

Developers 114 and 116 are examples of a number of developers who may work on developing and updating source code associated with the cloud-based service 110. The developers 114 and 116 may access a code development service executed on a server 108 through thick or thin client applications executed on client devices 112 and 118.

In a system according to embodiments, performance data associated with the source code of cloud-based service 110 may be collected at server level by a plurality of profiling agents deployed across the servers 102. The collected performance data may be aggregated at the server level mapping the data to cost profile information. An aggregation module may manage and schedule collection and aggregation (232) of the data and also further aggregation at a big data store. The big data store may be managed by one or more database servers such as server 234. One or more tables may be generated from the aggregated data at another server 236. A visualization module executed on one of the servers 236, 238, or 108 may generate a context-aware visualization based on the one or more tables to provide performance information to developers 114 and 116.

Figure 3:
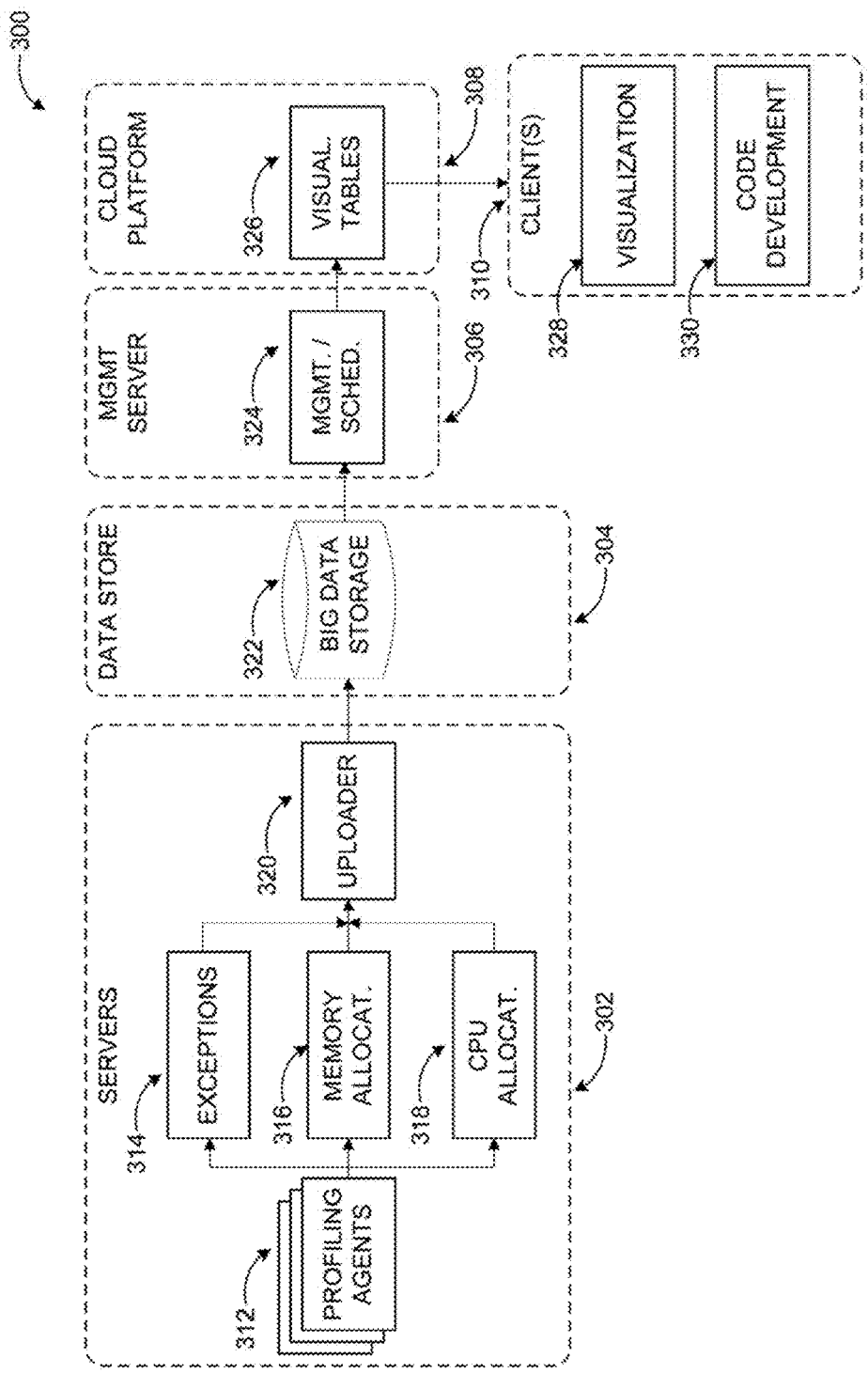
FIG. 3 is a display diagram illustrating an example always-on profiling pipeline that provides production telemetry insights inline to developer experience, according to embodiments.

FIG. 3 is a display diagram 300 illustrating an example always-on profiling pipeline that provides production telemetry insights inline to developer experience, according to embodiments.

As discussed previously, performance data associated with the executed source code of a hosted service may be collected at server level (servers 302) by profiling agents 312 deployed to the various servers and managed by an aggregation module executed on a management server 306. The profiling agents 312 may collect information associated with exceptions 314, memory allocations 316, processor allocations 318, and similar performance metrics. An uploader 320 may upload server level aggregated performance data to big data storage 322, which may be part of a data store 204. The aggregation module may manage and schedule (324) server level and/or big data store level aggregation of the data.

Visualization tables 326 may be generated based on the aggregated data at the big data store. The visualization tables 326 may be stored at the cloud platform level according to some embodiments. The visualization tables 326 may be generated and managed by the aggregation module or by a visualization module. The visualization module may also generate a context-aware visualization 328 (focused on a component associated with the developer) and provide to a client device/application 310 to be displayed to the developer. The client device/application 310 may further include code development application/service 330.

Figure 4:
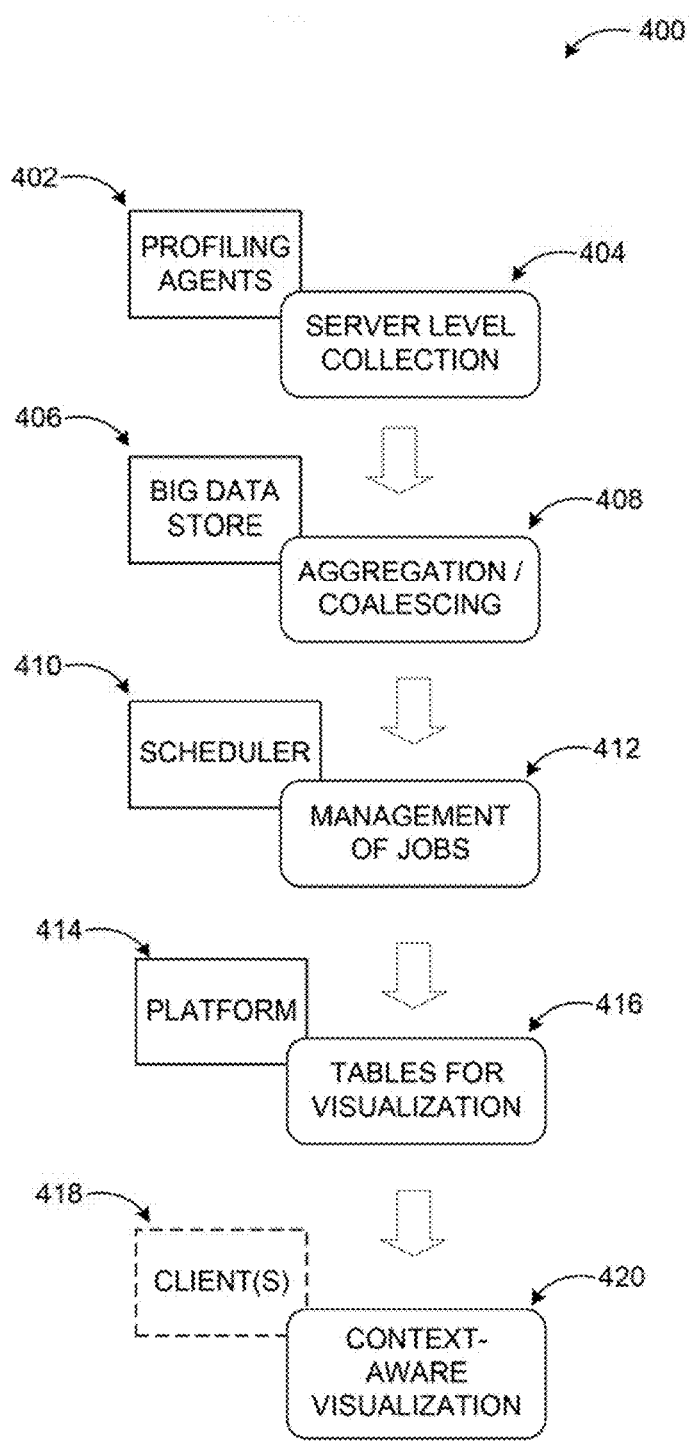
FIG. 4 is a display diagram illustrating major components and actions in a system providing production telemetry insights inline to developer experience, according to embodiments.

FIG. 4 is a display diagram illustrating major components and actions in a system providing production telemetry insights inline to developer experience, according to embodiments.

As shown in diagram 400, profiling agents 402 deployed on individual servers associated with the source code may collect (404) performance data based on a schedule and parameters defined by an aggregation module or scheduler 410. The collected data may be partially or completely aggregated at the server level and uploaded to special purpose servers to be stored data big data store 406, where it may be aggregated and coalesced (408). The scheduler 410 may manage jobs (412) (collection/aggregation of data).

Visualization tables 416 may be used to provide source data for context aware visualization 420 and stored at a cloud platform level 414. The context-aware visualization 420 may be provided to the developers through client devices/applications 418 along with code development user interfaces.

Figure 5:
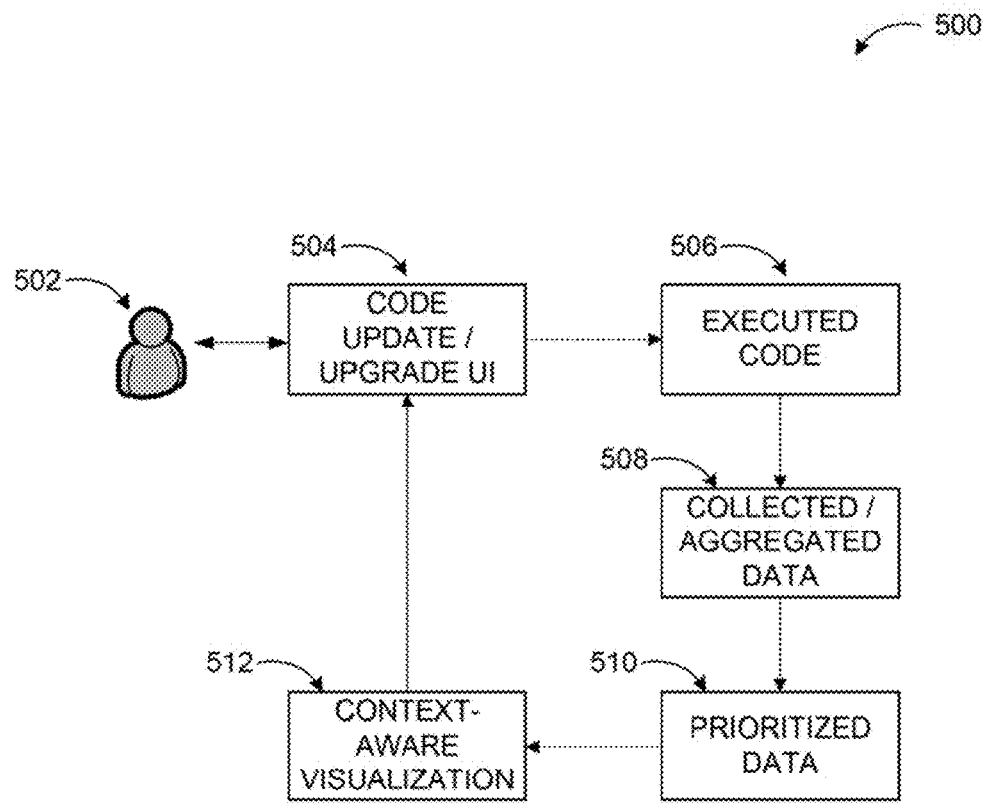
FIG. 5 is a display diagram illustrating a summary example of a system providing production telemetry insights inline to developer experience, according to embodiments.

FIG. 5 is a display diagram illustrating a summary example of a system providing production telemetry insights inline to developer experience, according to embodiments.

As shown in diagram 500, a developer 502 may be provided a user experience 504 for code development in conjunction with updating and upgrading a deployed source code. The executed code 506 may be monitored and performance data associated with exceptions, memory allocations, CPU usage, etc. collected at server level. The collected data 508 may aggregated at the server level, and then stored and further aggregated at a big data store. The aggregated data may be used to generate visualization tables, which may be provided to a visualization module to generate context-aware visualization 512 for the developer 502 based on the collected data.

The context-aware visualization 512 may include information associated with performance of select portions of the code during execution, exceptions, memory allocations, and processor usage. The information may be presented in conjunction with the portions (components) of code currently being worked on by the developer 502. The information may also be prioritized and ordered according to computing resource impact, severity of detected problems, and/or other parameters, which may be predefined or custom-defined by the developer. A threshold to determine which portion of the information is to be displayed may be predefined and/or customizable by the developer. Various presentation schemes as described herein may be employed to enhance the display of the information.

Figure 6:
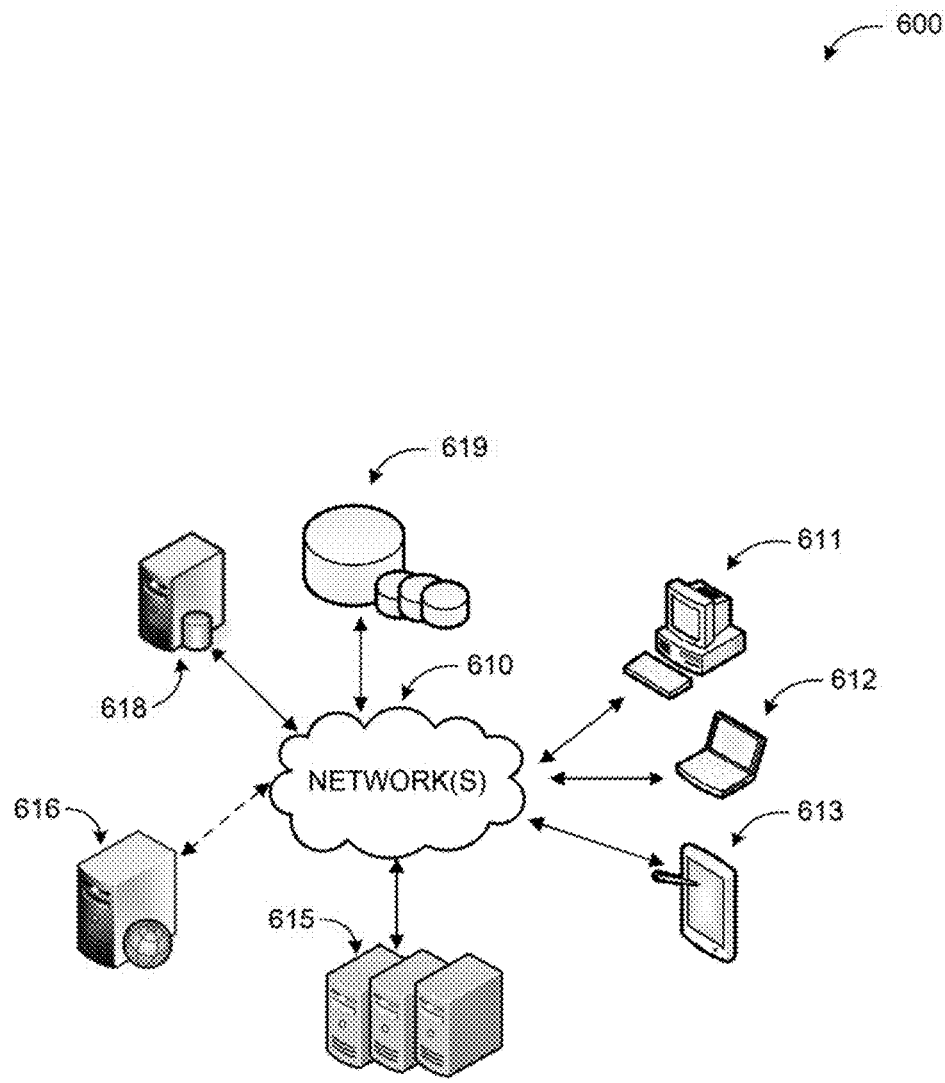
FIG. 6 is a simplified networked environment, where a system according to embodiments may be implemented.

FIG. 6 is a simplified networked environment, where a system according to embodiments may be implemented.

As shown in a diagram 600, a hosted service such as a cloud-based service may be implemented in a networked environment over one or more networks, such as a network 610. Participants may access service or one or more applications within the service through locally installed or thin (e.g., browser) client applications executed on a variety of computing devices 611-613, such as a smart phone 613, a mobile computer 612, or a desktop computer 611 ('client devices'). The service may interact with users through locally installed or thin (e.g., browser) client applications executed on a variety of computing devices. Large amounts of aggregated tracing and diagnostic data from an already deployed service may be curated, cost profile information (e.g., CPU, memory, exceptions, etc.) may be mapped to code components, and context specific recommendations and/or warnings may be provided to a developer working within the source code for the service in conjunction with different components. Thereby, detection and mitigation of potential problems may be enabled prior to the code being committed to a source code repository.

A service, as discussed herein, may be implemented via software executed over servers 615. The servers 615 may include one or more web servers 616, where at least one of the one or more web servers 616 may be configured to provide access to the service through web communications. The service may store data associated with performance metrics in a data store 619 directly or through a database server 618.

A computing device may communicate with the server over a network 610. The network 610 may comprise any topology of servers, clients, Internet service providers, and communication media. A system according to embodiments may have a static or dynamic topology. The network 410 may include multiple secure networks, such as an enterprise network, an unsecure network, or the Internet. The unsecure network may include a wireless open network. The network 610 may also coordinate communication over other networks, such as Public Switched Telephone Network (PSTN) or cellular networks. Furthermore, the network 610 may include multiple short-range wireless networks, such as Bluetooth, or similar ones. The network 610 may provide communication between the nodes described herein. By way of example, and not limitation, the network 610 may include wireless media. The wireless media may include, among others, acoustic media, RF media, infrared media, and other wireless media.

A textual scheme, a graphical scheme, an audio scheme, an animation scheme, a coloring scheme, a highlighting scheme, and/or a shading scheme may be employed to provide production telemetry insights inline to developer experience in conjunction with the functionality described herein.

Many other configurations of computing devices, applications, data sources, and data distribution systems may be employed for providing production telemetry insights inline to developer experience. Furthermore, the networked environments discussed in FIG. 6 are for illustration purposes only. Embodiments are not limited to the example applications, modules, or processes.

Figure 7:
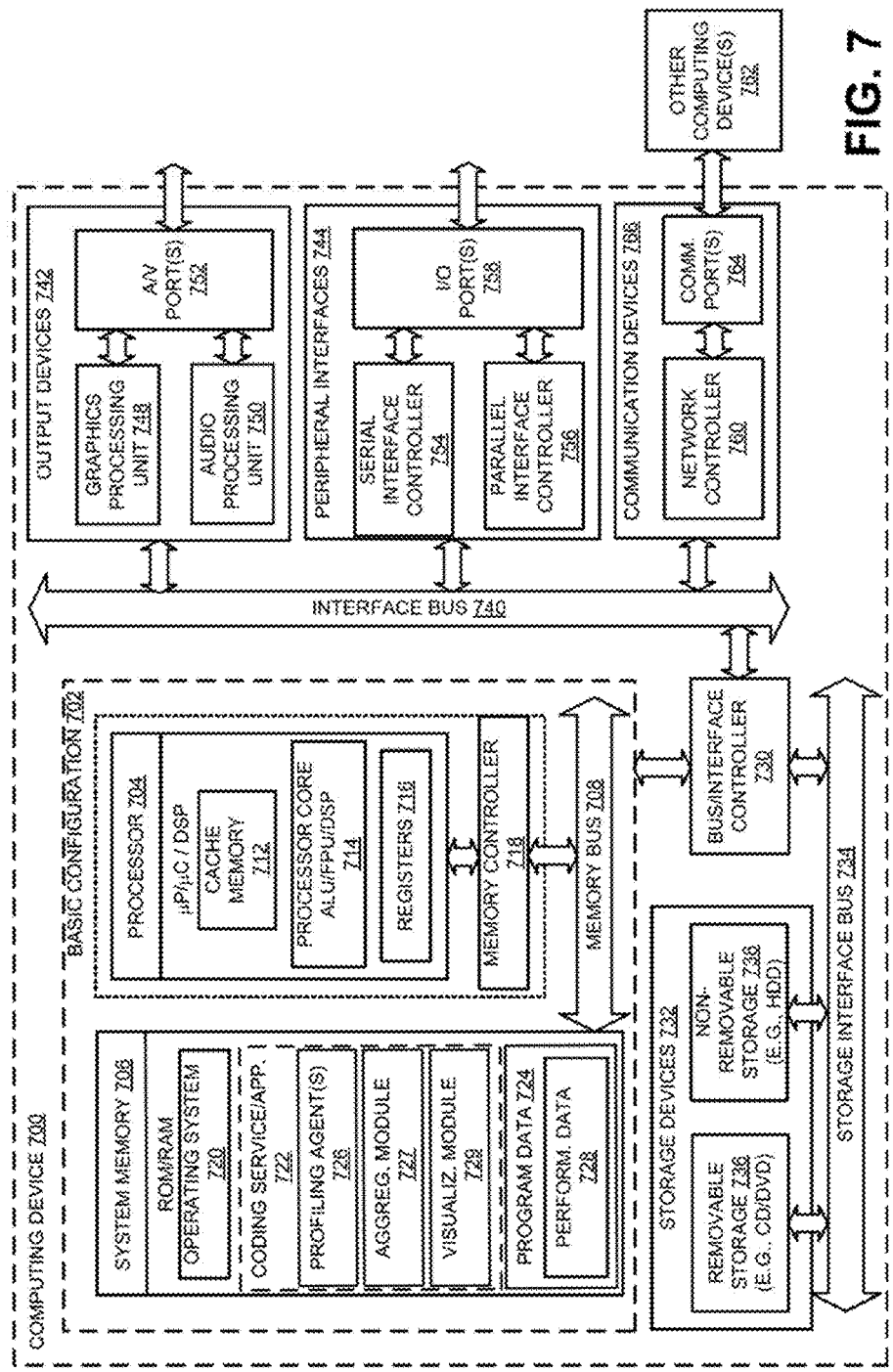
FIG. 7 is a block diagram of an example computing device, which may be used for providing production telemetry insights inline to developer experience, according to embodiments.

FIG. 7 is a block diagram of an example computing device, which may be used for providing production telemetry insights inline to developer experience, according to embodiments.

For example, a computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communication between the processor 704 and the system memory 706. The example basic configuration 702 may be illustrated in FIG. 7 by those components within the inner dashed line.

Depending on the desired configuration, the processor 704 may be of any type, including but not limited to a microprocessor (μP), a microcontroller (μC), a digital signal processor (DSP), or any combination thereof. The processor 704 may include one more levels of caching, such as a level cache memory 712, one or more processor cores 714, and registers 716. The one or more processor cores 714 may (each) include an arithmetic logic unit (ALU), a floating point unit (FPU), a digital signal processing core (DSP Core), or any combination thereof. An example memory controller 718 may also be used with the processor 704, or in some implementations, the example memory controller 718 may be an internal part of the processor 704.

Depending on the desired configuration, the system memory 706 may be of any type including but not limited to volatile memory (such as RAM), non-volatile memory (such as ROM, flash memory, etc.), or any combination thereof. The system memory 706 may include an operating system 720, a code development application service 722, and program data 624. The code development application/service 722 may include a one or more profiling agents 726, an aggregation module 727, and a visualization module 729, which may perform various tasks in providing production telemetry insights inline to developer experience. Program data 724 may include, among others, performance data 728 associated with execution of deployed code.

The computing device 700 may have additional features or functionality, and additional interfaces to facilitate communications between the example basic configuration 702 and any desired devices and interfaces. For example, a bus/interface controller 730 may be used to facilitate communications between the example basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the example basic configuration 702 via the bus/interface controller 730. Some of the one or more output devices 742 include a graphics processing unit 748 and an audio processing unit 750, which may be configured to communicate to various external devices such as a display or speakers via one or more A/V ports 752. The one or more peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 766 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media.

The computing device 700 may be implemented as a part of a general purpose or specialized server, mainframe, or similar computer, which includes any of the above functions. The computing device 700 may also be implemented as a personal computer including both laptop computer and non-laptop computer configurations.

Example embodiments may also include methods for providing production telemetry insights inline to developer experience. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by preselected criteria that may be machine automated.

Figure 8:
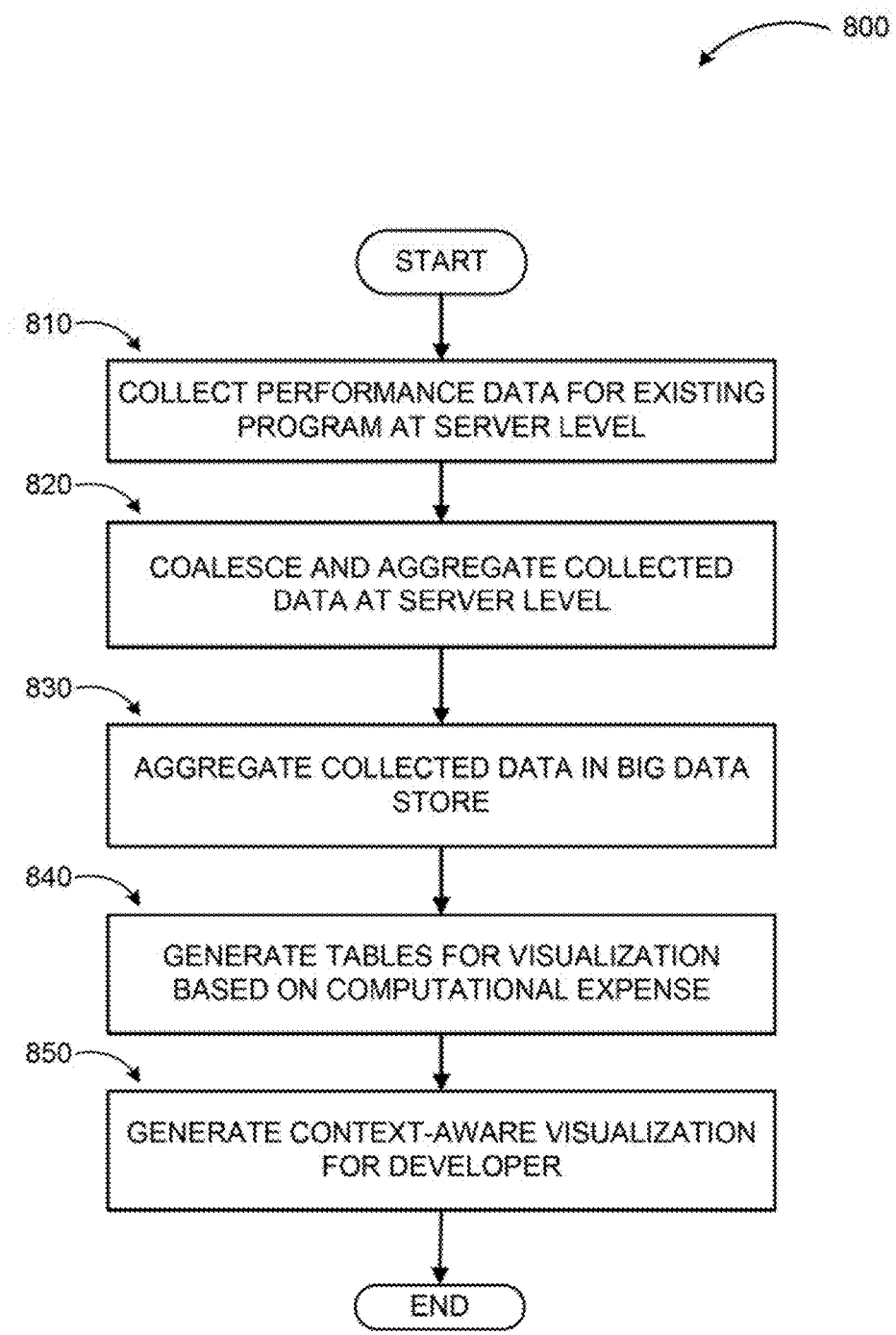
FIG. 8 is a logic flow diagram illustrating a process for providing production telemetry insights inline to developer experience, according to embodiments.

FIG. 8 is a logic flow diagram illustrating a process for providing production telemetry insights inline to developer experience, according to embodiments. A process 800 may be implemented by a code development service, a distributed application, a locally installed application, and/or their components, where the components may be executed on one or more servers or other computing devices.

The process 800 may begin with operation 810, where performance data for an already deployed service (and its components) may be collected at server level by profiling agents. Collected data may be coalesced and aggregated at server level at operation 820. For example, cost profile information may be mapped such as processor and memory usage associated with detected problems or performance points, exceptions, etc.

At operation 830, collected data may be aggregated in a big data store for the servers associated with the service. In a practical implementation, the hosted service may be associated with thousands of servers. At operation 840, tables may be generated for visualization based on computational expense (based an the cost profile mapping results). A visualization module may generate context-aware visualization for a developer working on the source code, for example updating or upgrading a component to provide feedback, a warning, or just context-aware information in conjunction with that component.

The operations included in process 800 are for illustration purposes. Providing production telemetry insights inline to developer experience may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some examples, a computing device to provide production telemetry insights inline to developer experience is described. The computing device may include a memory and a processor coupled to the memory, the processor executing a code development application in conjunction with instructions stored in the memory. The code development application may include a plurality of profiling agents deployed across servers executing a hosted service, the profiling agents configured to collect performance data associated with a source code of the hosted service at server level and aggregate the collected performance data at the server level mapping the data to cost profile information. The code development application may further include an aggregation module configured to manage and schedule aggregation of server level aggregated data at a big data store; and a visualization module configured to generate one or more tables from the aggregated data and generate a context-aware visualization based on the one or more tables to provide information to a developer associated with the performance of the source code.

According to other examples, the context-aware visualization may be provided through a user interface of the code development user interface in conjunction with a component of the source code being processed. The visualization module may be further configured to prioritize the provided information based on a computational expense and prioritize the provided information based on exceptions associated with the collected data. The provided information may include one or more of feedback, alerts, and recommendations. The profiling agents may be configured to collect the performance data based on a predefined period.

According to further examples, the aggregation module may be further configured to customize a collection period of the performance data based on input from the developer. The computing device may be a management server of a datacenter executing the hosted service or a code development server communicatively coupled to a datacenter executing the hosted service. The computing device may also include an analysis module configured to analyze the aggregated data to derive one or more of feedback, alerts, and recommendations for the developer. The analysis module may be integrated with the aggregation module or the visualization module.

According to other examples, a method executed at a datacenter sever to provide production telemetry insights inline to developer experience is described. The method may include collecting performance data associated with a source code of a hosted service at server level by a plurality of profiling agents deployed across servers of the datacenter executing the hosted service; aggregating the collected performance data at the server level mapping the data to cost profile information; managing aggregation of server level aggregated data at a big data store; generating one or more tables from the aggregated data; and generating a context-aware visualization based on the one or more tables to provide information to a developer associated with the performance of the source code.

According to yet other examples, managing the aggregation of the server level aggregated data may include scheduling server level collection of data by the profiling agents and scheduling the aggregation of the collected data at the big data store. The method may also include prioritizing the provided information based on an impact of observed performance events on computational resources. The method may further include including prioritized information above a predefined threshold in the generated visualization and providing a link to display additional information upon activation by the developer. The predefined threshold may be customizable by the developer.

According to further examples, a computer-readable memory device with instructions stored thereon to provide production telemetry insights inline to developer experience is described. The instructions may include collecting performance data associated with a source code of a hosted service at server level by a plurality of profiling agents deployed across servers of the datacenter executing the hosted service; aggregating the collected performance data at the server level mapping the data to cost profile information; managing aggregation of server level aggregated data at a big data store; generating one or more tables from the aggregated data; and generating a context-aware visualization based on the one or more tables to provide information to a developer associated with the performance of the source code, where the provided information is prioritized based on an impact of observed performance events on computational resources and prioritized information above a predefined threshold is included in the generated visualization.

According to some examples, the instructions may further include uploading the server level aggregated data to a special purpose server of the datacenter. The special purpose server may include one or more of an edge server, a management server, and a database server. The context-aware visualization may include information associated with a component of the source code assigned to the developer.

According to other examples, a means for providing production telemetry insights inline to developer experience is described. The means may include a means for collecting performance data associated with a source code of a hosted service at server level by a plurality of profiling agents deployed across servers of the datacenter executing the hosted service; a means for aggregating the collected performance data at the server level mapping the data to cost profile information; a means for managing aggregation of server level aggregated data at a big data store; a means for generating one or more tables from the aggregated data; and a means for generating a context-aware visualization based on the one or more tables to provide information to a developer associated with the performance of the source code.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide production telemetry insights inline to developer experience, the computing device comprising:
    a memory;
    a processor coupled to the memory, the processor executing a code development application in conjunction with instructions stored in the memory, wherein the code development application includes:
        a plurality of profiling agents deployed across servers executing a hosted service, the profiling agents configured to:
            collect performance data associated with a source code of the hosted service at server level;
        an aggregation module configured to:
            aggregate the collected performance data at the server level;
            determine cost profile information from the server level aggregated performance data;
            map the cost profile information to one or more components of the source code;
            manage and schedule aggregation of server level aggregated data at a data store; and
        a visualization module configured to:
            generate a visualization table containing the server level aggregated performance data and the cost profile information;
            generate a context-aware visualization based on the visualization table and a first component of the source code currently under development, wherein the context-aware visualization focuses on the first component of the source code associated with a developer and provides computational expense information and detected problems associated with an execution of the first component to the developer;
            order the server level aggregated performance data and the cost profile information within the context-aware visualization based on a computing resource impact and a severity of the detected problems; and
            provide to be presented inline to the developer working within the source code for the service, the context-aware visualization through a code development user interface in conjunction with the first component of the source code being processed prior to the first component of the source code being committed to a source code repository.

2. The computing device of claim 1, wherein the visualization module is further configured to prioritize the provided computational expense information based on exceptions associated with the collected performance data.

3. The computing device of claim 1, wherein the provided computational expense information includes one or more of feedback, alerts, and recommendations.

4. The computing device of claim 1, wherein the profiling agents are configured to collect the performance data based on a predefined period.

5. The computing device of claim 4, wherein the aggregation module is further configured to customize a collection period of the performance data based on input from the developer.

6. The computing device of claim 1, wherein the computing device is a management server of a datacenter executing the hosted service.

7. The computing device of claim 1, wherein the computing device is a code development server communicatively coupled to a datacenter executing the hosted service.

8. The computing device of claim 1, further comprising an analysis module configured to analyze the aggregated performance data to derive one or more of feedback, alerts, and recommendations for the developer.

9. The computing device of claim 8, wherein the analysis module is integrated with one of the aggregation module and the visualization module.

10. A method executed at a datacenter server to provide production telemetry insights inline to developer experience, the method comprising:
    collecting performance data associated with a source code of a hosted service at server level by a plurality of profiling agents deployed across servers of a datacenter executing the hosted service;
    aggregating the collected performance data at the server level;
    determining cost profile information from the server level aggregated performance data;
    mapping the cost profile information to one or more components of the source code;
    generating a visualization table containing the server level aggregated performance data and the cost profile information;
    generating a context-aware visualization based on the visualization table and a first component of the source code currently under development, wherein the context-aware visualization focuses on the first component of the source code associated with a developer and provides computational expense information and detected problems associated with an execution of the first component to the developer;
    ordering the server level aggregated performance data and the cost profile information within the context-aware visualization based on a computing resource impact and a severity of the detected problems; and
    providing to be presented inline to the developer working within the source code for the service, the context-aware visualization through a code development user interface in conjunction with the first component of the source code being processed prior to the first component of the source code being committed to a source code repository.

11. The method of claim 10, further comprising managing the aggregation of the server level aggregated data comprising:
    scheduling server level collection of data by the profiling agents; and scheduling the aggregation of the collected data at a data store.

12. The method of claim 10, further comprising:
    prioritizing the provided computational expense information based on an impact of observed performance events on computational resources.

13. The method of claim 12, further comprising:
    including the prioritized computational expense information above a predefined threshold in the generated context-aware visualization; and
    providing a link to display additional information upon activation by the developer.

14. The method of claim 13, wherein the predefined threshold is customizable by the developer.

15. A hardware computer-readable memory device with instructions stored thereon to provide production telemetry insights inline to developer experience, the instructions comprising:
    collecting performance data associated with a source code of a hosted service at server level by a plurality of profiling agents deployed across servers of a datacenter executing the hosted service;
    aggregating the collected performance data at the server level;
    determining cost profile information from the server level aggregated performance data;
    mapping the cost profile information to one or more components of the source code;
    generating a visualization table containing the server level aggregated performance data and the cost profile information;
    generating a context-aware visualization based on the visualization table and a first component of the source code currently under development, wherein the context-aware visualization focuses on the first component of the source code associated with a developer and provides computational expense information and detected problems associated with an execution of the first component to the developer;
    ordering the server level aggregated performance data and the cost profile information within the context-aware visualization based on a computing resource impact and a severity of the detected problems, wherein the first component of the ordered computational expense information above a predefined threshold is included in the generated context-aware visualization; and
    providing to be presented inline to the developer working within the source code for the service, the context-aware visualization through a code development user interface in conjunction with the first component of the source code being processed prior to the first component of the source code being committed to a source code repository.

16. The hardware computer-readable memory device of claim 15, wherein the instructions further comprise:
    uploading the server level aggregated data to a special purpose server of the datacenter.

17. The hardware computer-readable memory device of claim 16, wherein the special purpose server includes one or more of an edge server, a management server, and a database server.

* * * * *